United States Patent [19]

Walton, Jr. et al.

[11] Patent Number: 5,093,846
[45] Date of Patent: Mar. 3, 1992

[54] SIGNAL ACQUISITION USING MODULATION BY A PRESELECTED CODE GROUP

[75] Inventors: J. Rodney Walton, Jr., Sudbury; Anthony P. Holt, Waltham, both of Mass.

[73] Assignee: Sundstrand Data Control, Inc., Redmond, Wash.

[21] Appl. No.: 538,920

[22] Filed: Jun. 15, 1990

[51] Int. Cl.$^5$ .............................................. H03K 5/159
[52] U.S. Cl. ........................................ 375/96; 375/97; 364/715.11; 364/728.06
[58] Field of Search ............... 364/715.11, 724.11, 364/724.12, 728.01, 728.06; 370/93, 95.3, 105.4; 455/38; 375/14, 94, 96, 97, 116

[56] References Cited

U.S. PATENT DOCUMENTS

| | | | |
|---|---|---|---|
| 4,161,033 | 7/1979 | Martinson | 364/728.06 |
| 4,244,029 | 1/1981 | Hogan et al. | 364/728.06 |
| 4,498,141 | 2/1985 | Cooper | 364/715.11 |
| 4,754,457 | 6/1988 | Bright et al. | 364/715.11 |

Primary Examiner—Benedict V. Safourek
Attorney, Agent, or Firm—Henry D. Pahl, Jr.

[57] ABSTRACT

In the signal acquisition system disclosed herein, frequency, phase and time uncertainties are resolved essentially simultaneously by including a preselected code group in the transmitted signal and by applying the received signal to a differential detector and then to a passive differential matched filter, the parameters of which are selected in correspondence with a code group, thereby to generate a corresponding series of complex match values. The absolute magnitude of the complex sum of the match values is maximized when the received signal is modulated by the preselected code group. When the presence of the code group in the received signal is detected, the phasing of the complex sum is detected thereby to determine carrier frequency offset. A directly detected version of the received signal is applied to a corresponding masking filter and the phase of a resultant sum signal is detected to determine carrier phase offset.

9 Claims, 2 Drawing Sheets

SIGNAL ACQUISITION USING MODULATION BY A PRESELECTED CODE GROUP

The disclosure in this case includes a microfiche Appendix comprising two microfiche and a total of 116 frames.

BACKGROUND OF THE INVENTION

The present invention relates to the receiving of modulated signals and more particularly to a method of determining useful demodulation parameters of a received signal and in particular frequency, phase and code group timing.

Particularly with coherent modulation and detection schemes, it is necessary for the receiving system to know or to determine with considerable accuracy the frequency of the modulated carrier, its phase, and the time at which symbol intervals begin. In systems employing digital signal processing techniques, the frequency and phase are typically determined as offsets with respect to a local oscillator or clock. The determining of these parameters is conveniently referred to as the "acquiring" of the received signal. In analog signal processing systems, phase-locked loops are commonly employed in getting a lock on and thereby determining the carrier frequency and phase but such systems reach acquisition relatively slowly.

Particularly for burst mode transmissions, it is desirable that the received signal be acquired quickly. Burst mode transmissions are characterized in that the carrier is not continuously present but, rather, is transmitted only when data is to be transmitted. To facilitate the acquiring of a received signal, it is common to transmit a preamble which comprises three successive sections. First, an unmodulated carrier is transmitted for a preselected interval to allow a phase-lock loop at the receiving system to lock on and thereby determine the frequency and phase. Following the first section, a simple alternating pattern of zeros and ones is transmitted to establish symbol timing and modulation characteristics and this section is followed by the transmission of a unique code group which established symbol timing. Once the three sections of the preamble are transmitted, the useful data is transmitted and can be received with reasonable reliability.

As will be understood by those skilled in the art, the inclusion of a lengthy preamble in each transmission necessarily affects the total throughput of the data transmission scheme, particularly in burst mode transmission.

Among the several objects of the present invention may be noted the provision of a novel method for acquiring a received signal; the provision of such a method which does not require the initial transmission of an unmodulated preamble segment; the provision of such a method which does not require the transmission of a section of alternating ones and zeros; the provision of such a method which facilitates the rapid determination of frequency, phase and symbol timing in a received modulated signal; the provision of such a method which facilitates the receiving of burst mode transmissions; the provision of such a method which is highly reliable; the provision of such a method which may be implemented relatively simply and inexpensively. Other objects and features will be in part apparent and in part pointed out hereinafter.

SUMMARY OF THE INVENTION

In accordance with the method of the present invention, the signal which is to be received is modulated so as to include a preselected code group. The received signal is repetitively sampled at a preselected sampling interval to obtain a series of complex values. Each of the successive samples is multipled by the complex value of a sample which preceded that sample by a preselected number of sampling intervals thereby to generate a succession of computed complex values. Each of a shifting series of the computed complex values is treated with a respective mask value, the succession of mask values being precalculated in correspondence with the preselected code group as multiplied by a similarly delayed version of itself, thereby to generate a corresponding series of complex match values. The absolute magnitude of the complex sum of the match values is maximized when the receive signal is modulated by the preselected code group. When the magnitude exceeds a threshold value, the phasing of the complex sum is detected thereby to determine carrier frequency offset. Each of a shifting series of the complex sample values is also treated with a respective second mask value, the second mask values being selected in accordance with the frequency offset determined, thereby to generate a second succession of computed complex values. The second succession is summed and the phasing of the sum is detected to determine carrier phase offset.

BRIEF DESCRIPTION OF THE DRAWINGS

Corresponding reference characters indicate corresponding parts throughout the several views of the drawings.

DESCRIPTION OF THE PREFERRED EMBODIMENT

As is understood by those skilled in the art, signal processing can be performed by either analog or digital circuitry. Also, digital signal processing can be performed either by dedicated signal processing circuitry or by microprocessor based digital signal processing apparatus. The extent of equivalence between these different implementations is generally understood in the art and the choice of implementation is generally predicated on the frequencies and bandwidths involved as well as the complexity of the processes to be implemented.

Figure 1:
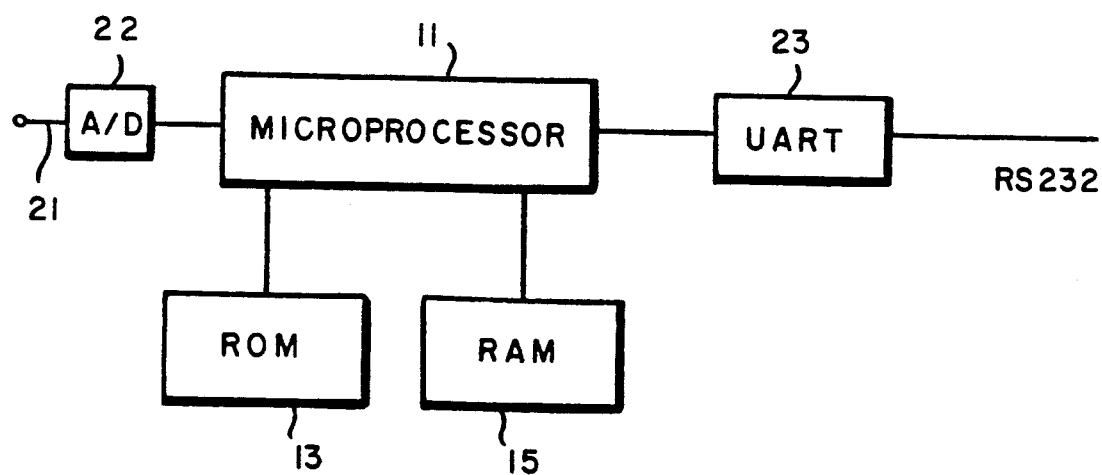
FIG. 1 is a schematic block diagram illustrating a microprocessor signal processing apparatus suitable for implementing the method of the present invention.

The method of the present invention is adaptable to the various types of implementation but the particular embodiment described herein is implemented by means of a microprocessor based digital signal processing apparatus. Such apparatus is illustrated in FIG. 1 and the particular function implemented by this apparatus, employing programming as described hereinafter, is a modem operating at a nominal carrier frequency of 4800 Hz. and employing minimum shift keying (MSK) modulation to effect a 2400 bit per second data rate. The particular microprocessor employed is a Texas Instruments TMS-320-C25 and this microprocessor is designated by reference character 11 in FIG. 1.

Associated with the microprocessor 11 is a read only memory 13 for storing the program which implements the methods and processes described hereinafter and a random access memory (RAM) 15 for storing data and samples and for facilitating the various mathematical calculations described hereinafter. A received signal provided through a lead 21 is repetitively sampled by an analog to digital converter 22 to yield a succession of digital values which are provided to the microprocessor 11. Data extracted from a received signal is provided to an RS 232 user interface by the microprocessor through a UART 23.

The signal processing system of the present invention may conveniently be described with reference to FIG. 2 which is, to some extent, generic to either a discrete implementation, i.e. where different components perform the different functions, or a microprocessor based implementation where the different functions are performed by different program sections.

Figure 2:
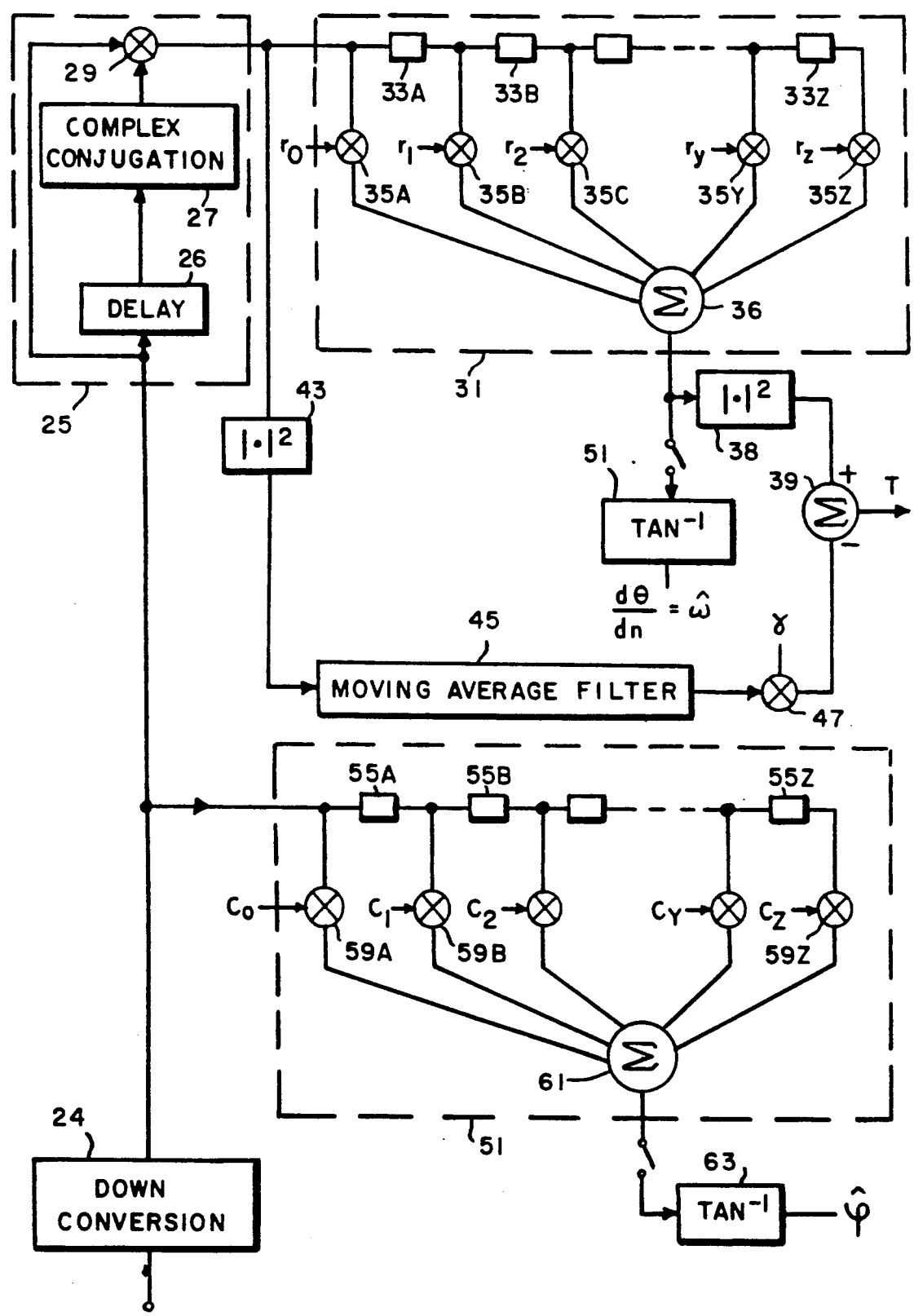
FIG. 2 is a schematic block diagram of a system for implementing the method of the present invention for determining demodulation parameters of a received signal.

Referring now to FIG. 2, the first step in the signal processing is down conversion or heterodyning. As indicated previously, the incoming samples represent a modulated signal having a nominal carrier frequency of 4800 Hz. The samples are multiplied as indicated by reference character 24 by complex values representing a locally generated 4800 Hz signal to generate a succession of complex sample values, i.e. values which have both real and imaginary components.

The successive complex samples are applied to a differential detector, designated generally by reference character 25, which effects a delaying of the input values as indicated at 26 together with a complex conjugation of the delayed values as indicated at 27 and a multiplication of the delayed and undelayed samples as indicated by reference character 29. The result of a multiplication is to generate a succession of computed complex values.

The computed values provided by the differential detector are applied to a passive differential matched filter 31. The matched filter 31 may be understood as comprising a shift register 33 providing a series of delay elements 33A-33Z. As will be understood, the number of delay elements will be proportional to the number of bits in the unique code group less the delay introduced by the differential detector and the designations suffixes A-Z to the reference characters are used only for convenience and not to imply that there are 26 elements. Again, it should be understood that the actual implementation is preferably by microprocessor so that the delays are effected by calculation or shifting of pointers as is understood by those skilled in the art. The shift register provides a continuously shifting series of the computed complex values. Each of the then extant complex values in the shift register is treated with a respective mask value as indicated by reference characters 35A-35Z.

The treating of each of the series of computed complex values passing through the shift register 33 yields a corresponding series of complex values which may be referred to as match values. These complex match values are summed as indicated by reference character 36 and are magnitude squared as indicated at reference character 38. While the treating elements 35A-35Z are indicated as performing multiplications, the mask values in the preferred embodiment are either $+1, +j$ or $-1, -j$ where $j=\sqrt{-1}$. As will be understood by those skilled in the art from the subsequent explanation, a more detailed weighting might also be applied but at the cost of greater complexity.

In accordance with the present invention, the mask values are precalculated in correspondence with the preselected code group as multiplied by a version of itself delayed by the same number of sampling intervals as the delay effected in the differential detector 25. Accordingly, the absolute value of the complex sum is maximized when the received signal is modulated by the preselected code group and that group arrives in the shift register 33. The particular method for calculating the mask values is described in greater detail hereinafter.

To provide a reliable indication of the time when a set of values corresponding to the preselected code group has arrived in the shift register, the magnitude signal is compared with a variable or floating threshold in a comparator 39. The floating threshold is generated in the following manner. The succession of calculated complex values which are applied to the matched filter 31 are also magnitude squared as indicated at reference character 43 and the successive values thereby obtained are applied to a moving average filter designated by reference character 45. The moving average filter averages over the same number of samples as is employed in the passive differential matched filter 31 so that the output of the averaging filter fluctuates in accordance with signal amplitude and noise in essentially the same manner as the magnitude output of the differential matched filter. A preselected weighting factor is applied to the output of the moving average filter as indicated by reference character 47 and the resultant value is applied as the other input of the comparator 39.

Depending on the number of samples which are considered, the input into the comparator may exceed the threshold for more than one sampling interval and, if desired, an algorithm can be implemented in the microprocessor to determine which sampling time produced the very highest magnitude value out of the passive differential matched filter. The time so determined defines the time of the code group.

Once the time of arrival of the unique code group is determined, the phase of the complex sum is determined by an arctangent detector as indicated by reference character 51. This value represents the rate of change of the incoming carrier with respect to the local clock which controls the timing of the signal used for down converting or heterodyning and thus is a measurement of frequency offset.

To precisely determine the actual phase of the received carrier, the successive incoming samples are applied without magnitude squaring or multiplication, to a shift register 55 comprising the succession of delay elements 55A-55Z which are essentially similar to the corresponding elements in the passive differential matched filter 31. Each of the shifting series of complex sample values passing through the shift register 55 are treated with a respective second mask value as indicated by reference characters 59A-59Z. Preferably, multiple sets of mask values are precalculated, each set being calculated in accordance with the preselected code group and a particular frequency offset so that, once the actual frequency offset is determined, a particular set of second mask values can be quickly applied to the series of sample values in the shift register 55.

The treating of the series of sample values with the second mask values yields a second succession of computed complex values. This second succession is summed as indicated by reference character 61 and the complex sum is subjected to an arctangent calculation as indicated at 63 thereby to detect the phasing of the sum value relative to the local clock and thereby to quite precisely determine carrier phase offset.

As will be understood by those skilled in the art, the preselected code group should be essentially unique and should be devised so that distinctive cross-correlations are obtained with reasonable values of delay introduced at the differential detector 25. In connection with the designing of a modem employing the signal acquisition method of the present invention a particular 32 bit unique sequence was devised for the implementation of signal acquisition in accordance with the invention. The unique word in HEX format is given as follows, the representation being given for least significant bit (LSB) first as well as most significant bit (MSB) first.

| MSB first | LSB first |
|---|---|
| DD956B6D | B6D6A9BB |

As indicated previously, the coefficients for the differential matched filter 31 and for the frequency compensated phase detector filter 51 should be calculated in relation to the particular unique word which is being detected. These coefficients may be calculated as follows:

Formula for Differential Matched Filter (31) Coefficients

Let $\{b_i\}$ be the complex data representing the unique word for $i\epsilon(0,31)$ where $\epsilon$ is inclusive. If the differential detector delay is denoted by 'd' and the sampling index employed is identical to the complex data rate index, then the coefficients employed in the differential matched filter $\{r_i\}$ are given by:

$$r_i = b_i^* b_{i-d};\ i\epsilon(d,31)$$

where * denotes complex conjugate.

Formula for Frequency Compensated Filter (51) Coefficients

If $\hat{\omega}$ is the radian frequency estimate derived from the frequency estimation procedure, the coefficients for the frequency compensated matched filter 51 are given by:

$$q_i = b_i^* e^{-j\hat{\omega} i};\ i\epsilon(0,31)$$

As may be understood from the foregoing explanation, the method of the present invention permits the three parameters which are important for accurate demodulation of a received signal to be determined merely from the reception of a preselected code group which may be inserted into the transmitted signal either at the start of a burst or periodically in the case of continuous transmission. Further, these values are determined with an accuracy which is sufficient to enable demodulation of the transmitted data by coherent techniques. As indicated previously, various types of modulation may be employed including MPSK (multiple phase shift keying) and SQPSK (staggered quadrature phase shift keying) in addition to MSK (minimum shift keying) and the particular choice of modulation technique is essentially independent of the signal acquisition techniques of the present invention which are useful with any of the modulation techniques. In the case of the signal acquisition system implemented by means of a microcomputer-based digital signal processing system as described herein, the detection of the user data modulated on the carrier may be performed by the same hardware which performs the signal acquisition as described herein.

In view of the foregoing it may be seen that several objects of the present invention are achieved and other advantageous results may be attained.

As indicated previously, the particular modem application which has been described herein by way of example was implemented using a Texas Instruments type TMS-320-C25 microprocessor. This processor is particularly intended for digital signal processing applications. The computer program which implements the modem functionality, including the signal acquisition method of the present invention, is set forth in the respective Texas Instruments assembly language in an microfiche appendix accompanying this application.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of determining useful demodulation parameters of a received signal which is modulated and which modulaton includes a preselected code group, which method comprises:

repetitively sampling the received signal at a preselected sampling interval to obtain a series of complex sample values;

multiplying the complex values of each of the successive samples by the complex value of a sample which preceded that sample by a preselected number of sampling intervals thereby to generate a succession of computed complex values;

treating each of a shifting series of said computed complex values with a respective mask value, the succession of said mask values being precalculated in correspondence with said preselected code group as multiplied by a version of itself delayed by said preselected number of sampling intervals, thereby to generate a corresponding series of complex match values, the absolute magnitude of the complex sum of which is maximized when the received signal is modulated by said preselected code group;

generating a signal corresponding to said magnitude; and comparing said magnitude signal with a threshold value to determine the likely presence of said code group in the received signal.

2. The method as set forth in claim 1 further comprising detecting the phasing of said complex sum thereby to determine carrier frequency offset.

3. The method as set forth in claim 1 further comprising treating each of a shifting series of said complex sample values with a respective second mask value, the succession of successive second mask values being calculated in accordance with said preselected code group, thereby to generate a second succession of computed complex values;

summing said second succession; and detecting the phasing of the sum of said second succession thereby to determine carrier phase offset.

4. The method of determining useful demodulation parameters of a received signal which is modulated and which modulation includes a preselected code group, which method comprises:

repetitively sampling the received signal at a preselected sampling interval to obtain a series of complex sample values;

multiplying the complex values of each of the successive samples by the complex value of a sample which preceded that sample by a preselected number of sampling intervals thereby to generate a succession of computed complex values;

treating each of a shifting series of said computed complex values with a respective mask value, the succession of said mask values being precalculated in correspondence with said preselected code group as multiplied by a version of itself delayed by said preselected number of sampling intervals, thereby to generate a corresponding series of complex match values, the absolute magnitude of the complex sum of which is maximized when the received signal is modulated by said preselected code group;

generating a signal corresponding to said magnitude;

comparing said magnitude signal with a threshold value to determine the likely presence of said code group in the received signal;

detecting the phasing of said complex sum thereby to determine carrier frequency offset;

treating each of a shifting series of said complex sample values with a respective second mask value, the succession of successive second mask values being calculated in accordance with said preselected code group and the frequency offset determined, thereby to generate a second succession of computed complex values;

summing said second succession; and detecting the phasing of the sum of said second succession thereby to determine carrier phase offset.

5. The method of determining useful demodulation parameters of a received signal in which a carrier having a nominal carrier frequency is modulated and which modulation includes a preselected code group, which method comprises:

repetitively sampling the received signal at a preselected sampling interval;

down converting said samples using a locally generated frequency nominally equal to said carrier frequency to obtain a series of complex sample values;

multiplying the complex values of each of the successive complex sample values by the complex value of a sample which preceded that sample by a preselected number of sampling intervals thereby to generate a succession of computed complex values;

treating each of a shifting series of said computed complex values with a respective mask value, the succession of said mask values being precalculated in correspondence with said preselected code group as multiplied by a version of itself delayed by said preselected number of sampling intervals, thereby to generate a corresponding series of complex match values, the absolute magnitude of the complex sum of which is maximized when the received signal is modulated by said preselected code group;

generating a signal corresponding to said magnitude;

comparing said magnitude signal with a threshold value to determine the likely presence of said code group in the received signal;

detecting the phasing of said complex sum relative to said locally generated frequency thereby to determine carrier frequency offset.

6. The method as set forth in claim 5 further comprising treating each of a shifting series of said complex sample values with a respective second mask value, the succession of successive second mask values being calculated in accordance with said preselected code group and the frequency offset determined, thereby to generate a second succession of computed complex values;

summing said second succession; and detecting the phasing of the sum of said second succession thereby to determine carrier phase offset.

7. Apparatus for acquiring a received signal which is modulated and which modulation includes a preselected code group, said apparatus comprising:

means for repetitively sampling the received signal at a preselected sampling interval to obtain a series of complex sample values;

means for multiplying the complex values of each of the successive samples by the complex value of a sample which preceded that sample by a preselected number of sampling intervals thereby to generate a succession of computed complex values;

means for treating each of a shifting series of said computed complex values with a respective mask value, the succession of said mask values being precalculated in correspondence with said preselected code group as multiplied by a version of itself delayed by said preselected number of sampling intervals, thereby to generate a corresponding series of complex match values, the absolute magnitude of the complex sum of which is maximized when the received signal is modulated by said preselected code group;

means for generating a signal corresponding to said magnitude; and means for comparing said magnitude signal with a threshold value to determine the likely presence of said code group in the received signal.

8. The apparatus as set forth in claim 7 further comprising means for detecting the phasing of said complex sum thereby to determine carrier frequency offset.

9. The apparatus as set forth in claim 7 further comprising means for treating each of a shifting series of said complex sample values with a respective second mask value, the succession of successive second mask values being calculated in accordance with said preselected code group, thereby to generate a second succession of computed complex values;

means for summing said second succession; and means for detecting the phasing of the sum of said second succession thereby to determine carrier phase offset.

* * * * *